Figure 1:
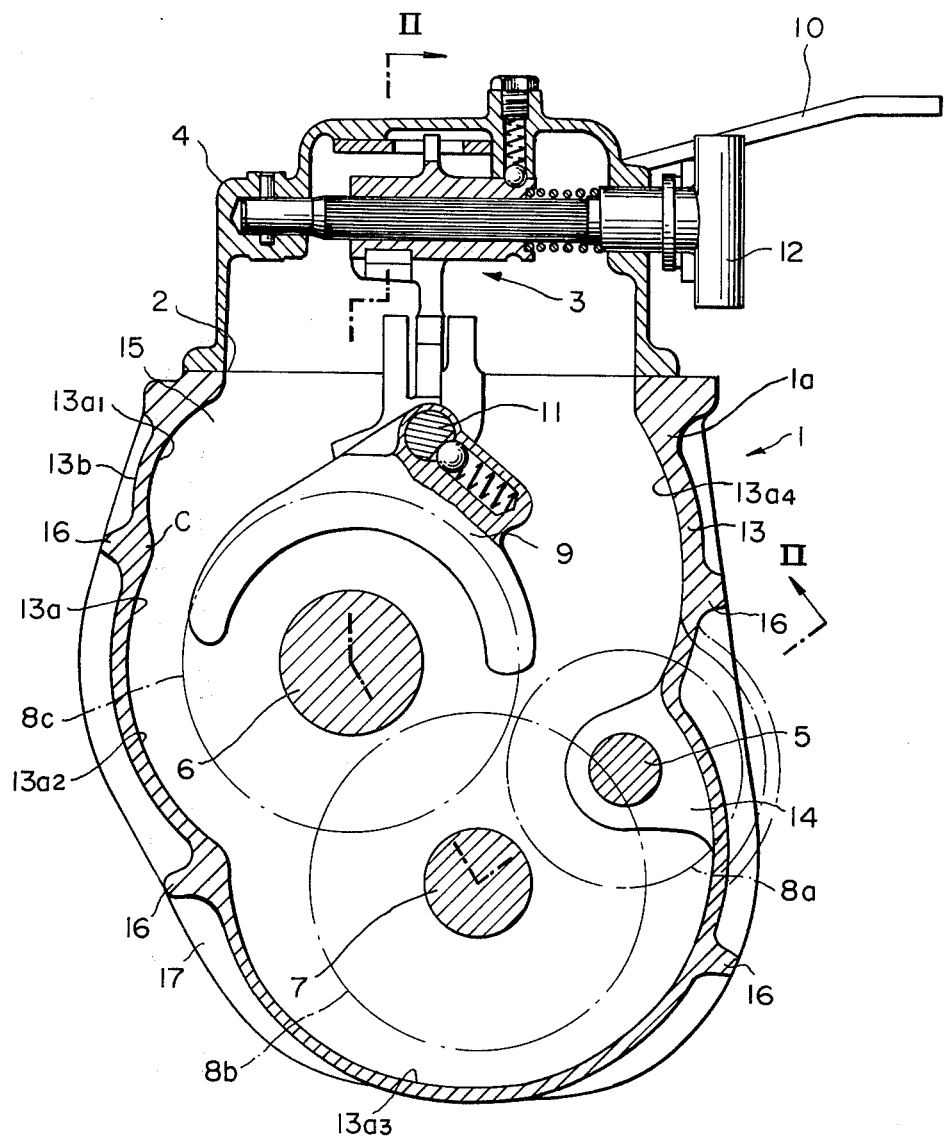

United States Patent [19]

Hata et al.

[11] 4,435,994
[45] Mar. 13, 1984

[54] AUTOMOBILE TRANSMISSION CASING HAVING REINFORCEMENT

[75] Inventors: Shuji Hata; Toshio Yamada; Katsuji Murakawa, all of Hiroshima, Japan

[73] Assignee: Toyo Kogyo Co., Ltd., Hiroshima, Japan

[21] Appl. No.: 277,603

[22] Filed: Jun. 26, 1981

[30] Foreign Application Priority Data

Jun. 27, 1980 [JP] Japan .............................. 55-90857[U]

[51] Int. Cl.³ ............................................ F16H 57/02
[52] U.S. Cl. .................................................. 74/606 R
[58] Field of Search ...................... 74/357, 753, 606 R, 74/359, 360; 192/112

[56] References Cited

U.S. PATENT DOCUMENTS 2,015,736 10/1935 Vandervoort .................... 74/606 R
4,108,021 8/1978 MacAfee et al. ................. 74/606 R

FOREIGN PATENT DOCUMENTS 1154355 9/1963 Fed. Rep. of Germany .... 74/606 R
52-139972 10/1977 Japan .
54-44368 3/1979 Japan .

Primary Examiner—Henry Jaudon
Attorney, Agent, or Firm—Fleit, Jacobson, Cohn & Price

[57] ABSTRACT

An automobile transmission including a peripheral wall having an inner surface comprised in a cross-section of a plurality of curved portions which are continuous in series with each other through inwardly projecting node portions. The configuration of the casing provides a structure of high rigidity so that it is effective to suppress the vibrations of the casing wall and consequently the noise caused by such vibrations. The casing wall is formed with brackets for supporting the reverse idle gear shaft in the vicinity of one of the node portions. This arrangement is also effective to suppress vibrations.

3 Claims, 2 Drawing Figures

AUTOMOBILE TRANSMISSION CASING HAVING REINFORCEMENT

The present invention relates to a transmission casing for automobiles.

Conventionally, in order to meet the recent trend of decreasing the weight of an automobile to thereby improve the fuel economy, transmission casings have been designed with thin walls and often made from aluminum based materials. In such light weight transmission casings, the walls are formed with ribs in an effort to decrease or suppress vibrations thereof. However, such structures have not been satisfactory in thin-walled transmission casings and there have been problems of noise produced at the walls of the transmission casings. It has been experienced that the noise due to vibrations of the walls of the transmission casings are produced not only when the automobiles are running but also in idling operations of the engines. It is presumed that such vibrations of the transmission casing walls are mainly caused by the beats among gear teeth which are produced due to the existence of backlash.

In order to solve the noise problems in an automobile transmission casing, Japanese utility model application No. 51-38850 which has been filed on Mar. 29, 1976 and laid open to public inspection on Oct. 24, 1977 under the disclosure No. 52-139972 proposes to provide a noise blocking plate along the inner wall surfaces of the transmission casing with a spacing thereto. However, the structure as proposed by the utility model is disadvantageous in that additional labor is required in attaching the noise blocking plate to the transmission casing.

It is therefore an object of the present invention to provide a transmission casing in which vibrations of walls can satisfactorily be suppressed.

Another object of the present invention is to provide a transmission casing in which walls are stiffened without requiring any additional weight and labor.

According to the present invention, the above and other objects can be accomplished by a transmission casing for automobiles which comprises a casing body having a wall formed at an upper portion with an opening which is adapted to be closed by a top cover provided with gear changing motion transmitting means, said casing being adapted for receiving transmission shafts extending longitudinally of the casing body for carrying transmission gears, said wall of the casing body having an inner surface which is of a cross-section comprised of a plurality of outwardly curved portions connected with each other at node portions projecting inwardly with respect to the curved portions, said wall being of a substantially uniform thickness and formed with reverse idle gear support bracket means in the vicinity of one of the node portions for supporting a reverse idle gear shaft. It is of course possible and more preferable to provide one or more ribs on the outer surface of the wall.

According to the features of the present invention, the wall of the casing body is sufficiently stiffened by the curvatures of the curved portions and also by the node portions between the curved portions. The reverse idle gear support bracket means provided in the vicinity of one of the nodes is effective to suppress the vibrations of the casing wall. The curvature of the curved portion may be coaxial with the gear closest to the particular curved portion, however, it may not always be coaxial with the closest gear.

Figure 2:
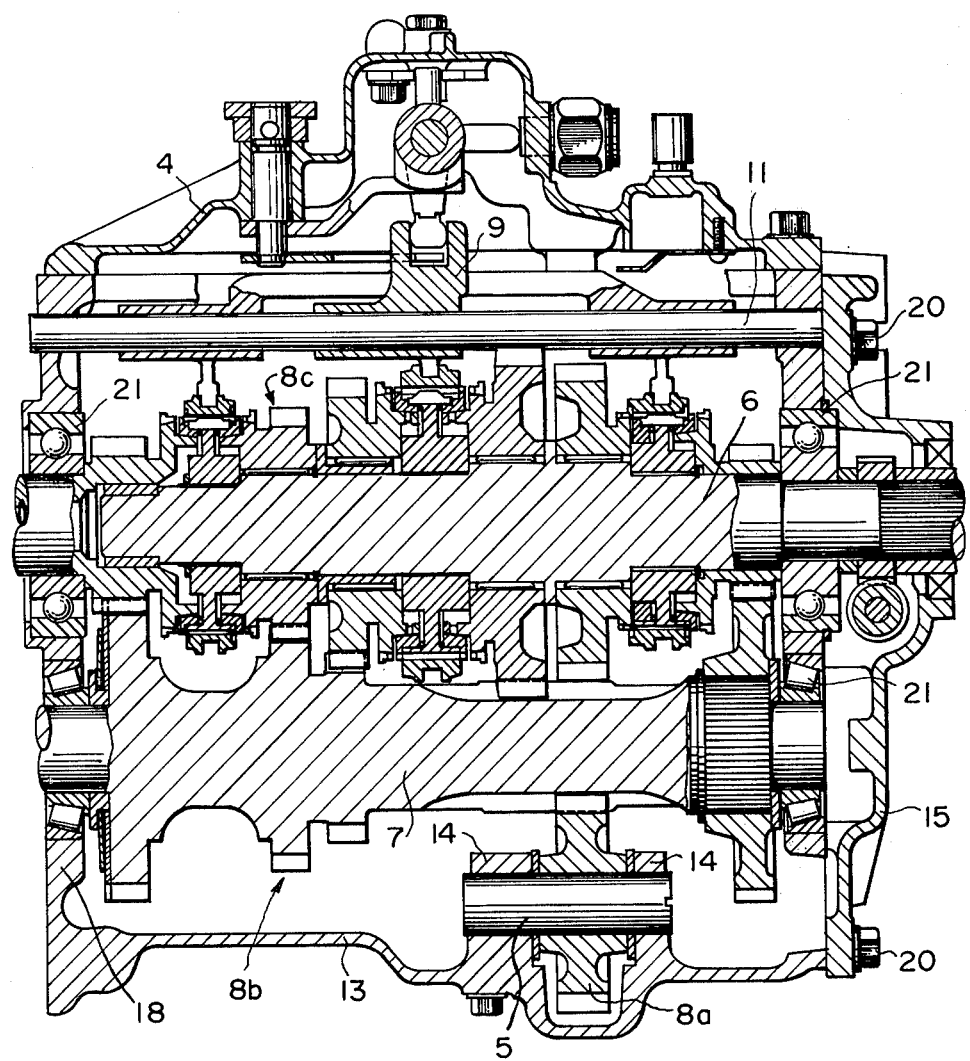

The above and other objects and features of the present invention will become apparent from the following descriptions of a preferred embodiment taking reference to the accompanying drawings, in which:

FIG. 1 is a cross-sectional view of a transmission assembly having a casing in accordance with one embodiment of the present invention; and, FIG. 2 is a sectional view taken substantially along the line II—II in FIG. 1.

Referring now to the drawings, it will be noted that the transmission assembly shown therein includes a casing 1 which comprises a casing body 1a having a top opening 2. A top cover 4 having a gear changing motion transmitting mechanism 3 is attached to the casing body 1a so as to close the top opening 2. In the casing 1, there are disposed a reverse idle gear shaft 5, a main shaft 6 and a counter shaft 7 which extends longitudinally of the casing 1. As well known in the art, the shafts 6 and 7 have a plurality sets of gears 8c and 8b and the shaft 5 carries a reverse idle gear 8a.

The gear changing motion transmitting mechanism 3 incluees, as well known in the art, a shift rod 11 arranged above and in parallel with the main shaft 6 and carrying a shift fork 9. In order to slidably move one of the shift fork 9, there is provided a select layer 10. Further, a shift lever 12 is provided for moving the shift fork 9 along the shift rod 11. The select lever 10 and the shift lever 12 are connected with a gear change lever (not shown) so that the levers 10 and 12 are appropriately actuated by the gear change lever.

The casing body 1a includes a peripheral wall 13 constituting a substantial part of the body 1a and an end wall 18 formed integrally with the peripheral wall 13 at one longitudinal end thereof. At the other end, the casing 1 has an end cover 15 attached to the casing body 1a by means of bolts 20. The main shaft 6 and the countershaft 7 are carried rotatably by the end wall 18 and the end cover 15 through suitable bearings 21. The reverse idle gear shaft 5 is supported by a pair of brackets 14 which are formed integrally with the peripheral wall 13 of the casing body 1a.

Referring to FIG. 1, it will be noted that the peripheral wall 13 of the casing body 1a has an inner surface 13a comprised of a plurality of outwardly curved portions $13a_1$, $13a_2$, $13a_3$ and $13a_4$ which are continuous in series to form node portions C therebetween. The curved portion $13a_2$ has a curvature which is substantially coaxial with the main shaft 6 and the gears 8c carried thereon. However, the curved portions $13a_1$ and $13a_4$ do not have curvatures coaxial with any of the gears. Further, the curved portions $13a_3$ does not have particular curvature. In FIG. 1, it will further be noted that the peripheral wall 13 of the casing body 1a is expanded as shown by phantom lines to accommodate for the reverse idle gear 8a. The peripheral wall 13 of the casing body 1a further has an outer surface 13b which provide the wall 13 with a substantially uniform thickness.

The brackets 14 for supporting the shaft 5 are formed in the vicinity of the node C between the curved portions $13a_3$ and $13a_4$ as shown in FIG. 1. The casing body 1a is further formed with a suitable number of longitudinal ribs 16 and circumferential ribs 17 for the purpose of reinforcing the peripheral wall 13. It will be understood that, when the transmission casing 1 is subjected to vibrations transmitted thereto from the gears 8a, 8b and 8c through the reverse idle gear shaft 5, each curved portion will be vibratorily deflected with the node portion C acting as a node of vibration and the intermediate part of each curved portion as an antinode. According to the feature of the present invention, the brackets 14 supporting the reverse idle gear shaft 5 are located in the vicinity of one of the node portions C as described previously, so that transmittal of the vibrations through the shaft 5 to the casing wall 13 can significantly be weakened. It should further be noted that the plurality of curved portions $13a_1$, $13a_2$, $13a_3$ and $13a_4$ formed in the peripheral wall 13 give an increased rigidity to the wall 13. Therefore, it is possible to decrease the possibility of producing resonant vibrations in the wall 13.

Vibrations may further be transmitted from the gears through the main shaft 6 and the countershaft 7 and then through the end cover 15 and the end wall 18 to the peripheral wall 13. Such vibrations can sufficiently be suppressed because the peripheral wall 13 is stiffened by the configuration comprised of the curved portions $13a_1$, $13a_2$, $13a_3$ and $13a_4$. In the illustrated embodiment, the ribs 16 and 17 on the peripheral wall 13 serve to give an additional rigidity to the wall 13 so that the vibrations can further be suppressed.

In the illustrated embodiment, it will further be noted that a line passing through the center of the reverse idle gear shaft 5 and the center of the main shaft 6 intersects the wall 13 in the vicinity of the node portion C between the curved portions $13a_1$ and $13a_2$. This arrangement is effective to suppress the noise caused by the vibrations produced in the peripheral wall 13 due to the vibrations transmitted through the main shaft 6. It should of course be noted that a sufficient rigidity can be provided in the peripheral wall 13 only by the curved portions without forming the ribs 16 and 17.

The invention has thus been shown and described with reference to a specific embodiment, however, it should be noted that the invention is in no way limited to the details of the illustrated structures but changes and modifications may be made without departing from the scope of the appended claims.

We claim:

1. A transmission casing for automobiles which comprises a casing body having a wall formed at an upper portion with an opening which is adapted to be closed by a top cover provided with gear changing motion transmitting means, said casing being adapted for receiving a main shaft, a countershaft and a reverse idle gear shaft which extend longitudinally of the casing body for carrying transmission gears, said wall of the casing body having an inner surface which is of a cross-section comprised of a plurality of outwardly curved portions connected with each other at node portions projecting inwardly with respect to the curved portions, at least one of said curved portions having a curvature which is not coaxial with one of said shafts, said wall being of a substantially uniform thickness and formed with reverse idle gear support bracket means in the vicinity of one of the node portions for supporting the reverse idle gear shaft, one of said node portions being located in the vicinity of the point of intersection between the inner surface of the wall of the casing body and a line passing through the center of said main shaft and the center of the reverse idle gear shaft.

2. A transmission casing in accordance with claim 1 in which said wall of the casing body is formed at an outer surface with reinforcement rib means.

3. A transmission casing for automobiles which comprises a casing body having a wall formed at an upper portion with an opening which is adapted to be closed by a top cover provided with gear changing motion transmitting means, said casing being adapted for receiving a main shaft, a countershaft and a reverse idle gear shaft which extend longitudinally of the casing body for carrying transmission gears, said wall of the casing body having an inner surface which is of a cross-section comprised of a plurality of outwardly curved portions connected with each other at node portions projecting inwardly with respect to the curved portions, said wall being of a substantially uniform thickness and formed with reverse idle gear support bracket means in the vicinity of one of the node portions for supporting a reverse idle gear shaft, one of said node portions being located in the vicinity of the point of intersection between the inner surface of the wall of the casing body and a line passing through the center of one of the transmission shafts and the center of the reverse idle gear shaft.

* * * * *